Feb. 16, 1960 — S. A. MINERA — 2,925,147
LUBRICANT DISPENSER
Filed June 7, 1957
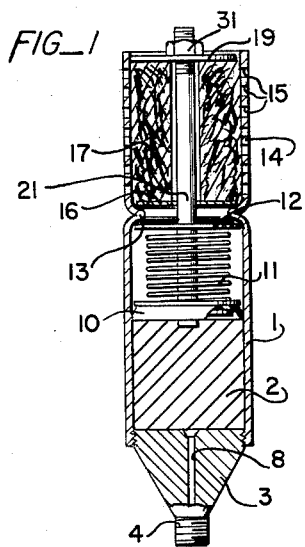
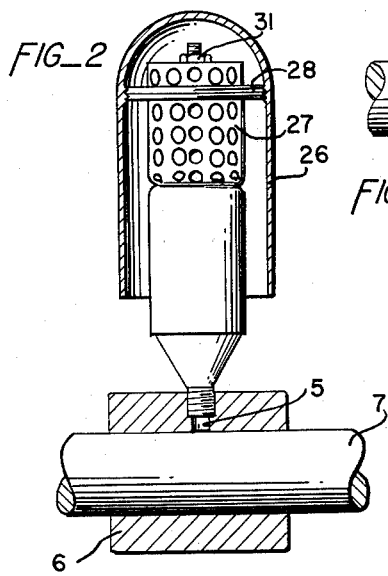
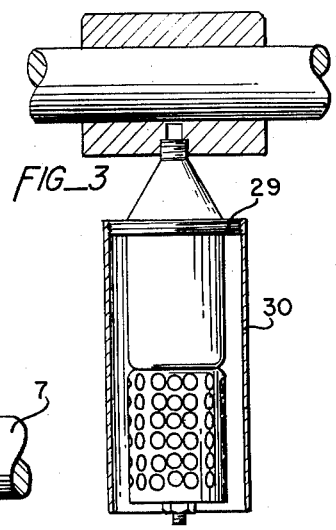
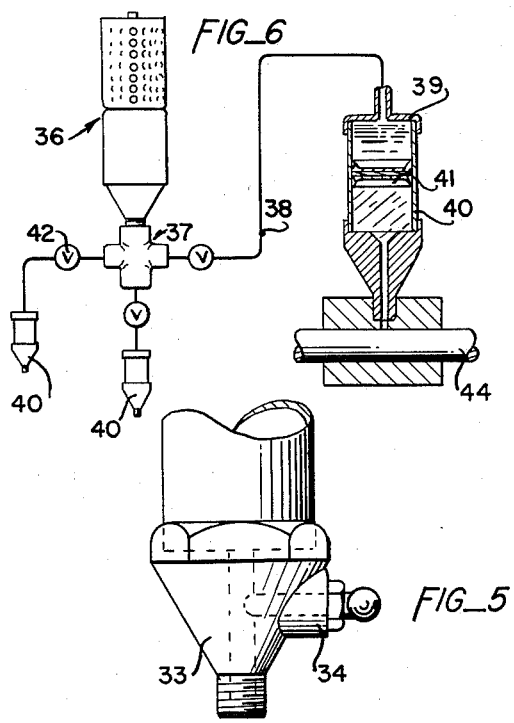
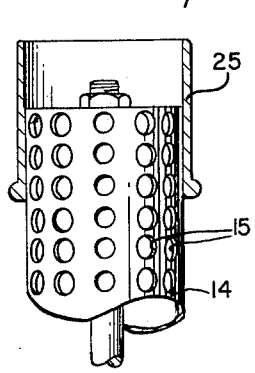
INVENTOR.
SALVADOR A. MINERA
BY
Baytan, Mahler & Wood
ATTORNEYS

United States Patent Office 2,925,147
Patented Feb. 16, 1960

2,925,147
LUBRICANT DISPENSER

Salvador A. Minera, San Francisco, Calif.

Application June 7, 1957, Serial No. 664,310

8 Claims. (Cl. 184—45)

This invention relates to a lubricating device and to a method of lubricating or of dispensing a lubricant to a bearing.

One of the objects of the invention is to provide means for automatically maintaining a film of a lubricant in bearings between the latter and the shafts therein or between the bearing surfaces and whatever is mounted thereby for rotary, reciprocatory or other movement.

Another object of the invention is the provision of means for continuously, but slowly, forcing a film of grease or any other lubricant between relatively movable surfaces that require lubrication and which may be close fitting so as to require a predetermined pressure on the lubricant.

A still further object of the invention is the method of dispensing a lubricant to a bearing in which the rate at which the lubricant is fed to the bearing is directly proportional to the rate of sublimation of a solid and which solid is interposed between a power transmitter and the lubricant to hold the transmitter against free movement thereof but to permit the full power going to the transmitter to be applied to the lubricant.

Heretofore it has been customary for a workman or maintenance engineer to periodically inject a lubricant through suitable fittings to the bearings of machines. Normally, a considerable amount of grease is forced out of the bearings, most of it being surplus grease that is wasted, since the only effective grease or oil is that which covers the bearing surfaces, and in a reasonably well fitted bearing this amounts to a very small film which is soon dissipated. Consequently most bearings usually lack a lubricant and as a result, the bearings and shafts or slides become worn and loose long before they should, or in some instances they are seriously damaged or are burned out due to the generation of heat from lack of grease or oil.

The present invention provides a means for constantly maintaining a film of grease on the bearing surfaces, and which means is positive in that the feed of the grease or oil to the bearing is under substantial pressure, hence there can be no failure of the grease being injected into the bearing.

Other objects and advantages will appear in the description and in the drawings.

In the drawings,

Fig. 1 is a cross sectional view through a lubricating device;

Fig. 2 is a view similar to that of Fig. 1 but which device is in position above and on a bearing and is provided with a protective cover.

Fig. 3 is a view similar to that of Fig. 2 except that the device is below a bearing and is provided with a different type of cover for protecting it when in this position.

Fig. 4 is an enlarged fragmentary view showing one means for regulating the rate of sublimation of the solid that is used, and to thus regulate the rate of discharge of the lubricant.

Fig. 5 is an enlarged fragmentary view showing one means by which the device may be recharged with a lubricant without removing the device from a machine.

Fig. 6 shows a lubricating system in which several different grease or lubricant containers may be controlled from a single device containing the sublimable solid, but in which the power for dispensing the grease is distributed to the different grease containers.

In detail, referring to Fig. 1, a cylinder 1 adapted to contain a lubricant 2 is provided with a fitting 3 at one end, which fitting preferably is formed with an externally threaded end portion 4 that is adapted to be threadedly held in a complementarily threaded passageway 5 (Fig. 2) in a bearing 6, which passageway communicates with the bore of the bearing in which a shaft 7 or other member is movably supported. The fitting is apertured or formed with a passageway 8 that extends through the end portion 4 for delivery of the grease 2 or other suitable lubricant, to the bearing.

A piston 10 is reciprocable within the cylinder 1 and is adapted to be spring biased by a spring 11 against the body 2 of the lubricant for forcing the latter through the discharge aperture or passageway 8. The piston illustrated in Fig. 1 is in the form of a cup washer supported between suitable washers with the cup side of the washer against the lubricant to prevent leakage of the latter past the piston, but any suitable piston structure may be employed that will urge the lubricant through passageway 8 without objectionable leakage therepast.

The spring 11 reacts between a head or washer 12 and the piston, and may exert a pressure of any desired amount against the piston according to the circumstances such as the type of lubricant, the closeness of the fit of shaft 7, the length or area of bearing surface to receive a lubricant, the rate of rotation of the shaft and the load on the latter. Whether the spring 11 exerts a pressure of one pound or twenty pounds per square inch on the lubricant, the pertinent feature is that, with the present invention the rate of discharge of the lubricant will be the same and will be relatively slow, yet the full force of the spring will be directly transmitted to the piston and from the latter to the grease or oil 2. Usually the lubricant in cup 1 is grease and whether the grease is heavy or thin, the rate of discharge will be the same.

The head 12 may abut a radially inwardly directed shoulder 13 formed in the walls of the cylinder 1, and a substantial portion 14 of said cylinder extends past the shoulder 13 at the side of the latter opposite to the lubricant carrying portion 1 of said cylinder. For convenience, the portion 14 will be called cylinder 14, since it may be threadedly connected with the cylinder 1 through a suitable coupling carrying shoulder 13 or forming a solid head if desired. Cylinders 1 and 14 are preferably coaxial and the walls of the latter are formed with openings 15.

Adjacent to the head 12, which may be a removable washer, but at the side of shoulder or rib 13 opposite to the side against which head 12 engages, is a second head 16, and within cylinder 14 above head 16 is a body 17 of a sublimable solid, such, for example, as camphor.

This body 17 is held between head 16 and an upper end member 19 that is movable longitudinally of cylinder 14 toward head 12. This member 19 may be a washer similar to head 12 or 16.

A piston rod 21 is rigidly connected at one end with the piston 10 and slidably extends through heads 12, 16 and through the body 17 and is connected at its upper or outer end with the member 19. Rod 21 is preferably coaxial with cylinders 1, 14 and extends centrally through the helical spring 11.

When spring 11 is compressed the piston 10 will be adjacent to the head 12 and member 19 will be at the end of cylinder 14 that is remote from cylinder 1. Assuming the body 17 of a sublimable solid is held within the cylinder 14 between member 19 and head 16, and the cylinder 1 is filled with a lubricant, such as grease, it will be seen that the piston 10 will travel toward the fitting 3 only as fast as the body 17 sublimes. The body 17 is preferably in a granular or broken form, but may be packed in relatively tight, and a screen may line the cylinder if desired.

The rate at which the solid 17 sublimes is to a great extent dependent upon the degree of its exposure to the atmosphere, hence an imperforate sleeve 25 (Fig. 4) may be slidable over the cylinder 14 to close more or less of the openings 15 as desired. The sleeve 25 may be frictionally held in its adjusted position.

Fig. 2 shows a device that is substantially the same as the device of Fig. 1 except that it is provided with a hood 26 spaced around but enclosing the cylinder 27, which cylinder corresponds to cylinder 14 except that it carries a perforated flange 28 that may be threadedly connected with the hood 26 for holding the hood in place.

The form of device shown in Fig. 2 is usually employed when the device extends generally vertically above the bearing carrying the same, and where the device is exposed to the elements or to water, dirt, etc. from which it should be protected.

If the device is below a bearing, and in a position generally inverted, as in Fig. 3, a flange 29 on cylinder 1 may be provided, and a sleeve 30 threadedly held thereon in depending relation thereto extending over the sides of cylinder 14 and below the latter. In this case flange 29 is imperforate and in combination with the sleeve 30 it prevents water or other undesirable foreign material from contaminating the body 17 of sublimable material.

A nut 31 on the outer end of the piston rod 21 will hold the member 19 on the rod when the spring 11 is under compression, and spring 11 is always under compression exerting a substantial pressure on the lubricant sufficient to cause its uniform discharge from the cylinder 1 through fitting 3 even when the piston is at the end of its stroke and when substantially all of the lubricant has been dispensed from the cylinder 1.

In operation when the body 17 has been completely sublimed, the piston 10 will be at substantially the end of its discharge stroke. Usually the workman whose duty it is to maintain the devices will replace the exhausted devices with filled ones, and the exhausted devices will then be refilled for future use, the refilling being done close to the time when they are to be used, or else they may be kept in a sealed container so as to prevent sublimation of the body 17 until they are installed.

Fig. 5 shows a modified form of device in which the fitting having the discharge passageway therein, and designated 33, carries a conventional valved inlet 34 of the type that is connectable with a conventional grease gun for admitting grease under pressure into passageway 34 in the fitting and from said passageway into the grease or lubricant holding cylinder corresponding to cylinder 1. The piston will be forced to the end of the cylinder and nut 31 on the cylinder 14 or 27 may then be removed to permit removal of member 19 so that cylinder 14 or 27 may be refilled with the sublimable body 17. In the form shown in Fig. 5, it is not necessary to remove the device from the bearing in order to charge the grease cylinder 1 with grease. In this form of device, it may be noted that the fitting 33 may be interiorly threaded for engagement with the outside of the grease cylinder.

In some instances the same principle may be employed to apply a discharge pressure to different bearings, as seen in Fig. 6 in which a device 36 of substantially the same structure as that of Fig. 1 or 5 may be provided. The fitting 3 may be connected to a multi-way coupling member 37 that in turn may have each passageway therein connected by a tube or pipe 38 with a head 39 on one end of a cylinder 40. The other end of each cylinder 40 may have a fitting corresponding to the fitting 3 or 33 and which fitting is connected with a different bearing 44. Within each cylinder 40 is a floating piston 41 that may be of the double cup-type to prevent leakage therepast in either direction. A suitable liquid fills pipes 38 and the cylinder 1 of the device 36, so that the pressure exerted by piston 10 on the liquid will be transmitted to each of the devices 40 and the grease or lubricant from each of the latter will be discharged in the same manner as in the device of Fig. 1. If desired, each pipe 38 may have a valve 42 therein for shutting off the pressure to any one or more of the cylinders 40. Thus if more than one machine is serviced by the master cylinder, and all are not operating, the discharge of grease may be restricted to only the operating machines or parts.

It is obvious, of course, that a fitting 37 could be used on the device of Fig. 1 and the lubricant in the device could be conducted through pipes 38 directly to the different machines or bearings. The arrangement in Fig. 6 is normally employed where relatively heavy grease is dispensed and where pipes 38 may be so long as to create a high resistance to movement of the grease through the pipes.

While camphor (2-camphanone) 2-keto-1, 77-trimethylnol-camphane, has been mentioned as a most suitable sublimable solid, since it sublimes readily at room temperature and atmospheric pressure, and is only slightly soluble in water, other solids may be employed, such as, Ammonium carbonate—carbamate $$(NH_4)HCO_3 + (NH_4)COONH_2$$

Ammonium chloride $NH_4Cl$ (Salmiac)
Iodine (elemental)
Mercuric chloride
o-Aminophenol $C_6H_7NO$
Benzoic acid $C_6H_5COOH$
p-Dichlorobenzene $C_6H_4Cl_2$
Dichloronaphthalone 1,5 and 1,6
Diphenylacetic acid $(C_6H_5)_2CH \cdot COOH$ and $C_{14}H_{12}O_2$
Methyl-ethyl catechol aldehyde 3,4,1
1,4-naphthoquinone
Nicotinic acid
Pentachlorophenol
Pentamethylethanol or
Trimethylbutanol-3, $$C_7H_{16}O \quad (CH_3)_3-CH_2-C(CH_3)_2 \cdot OH$$

Phloroglucinol 1,3,5 trihydroxybenzene $C_6H_6O_3$
Ortho-hydroxy-benzyl alcohol $OH \cdot C_6H_5 \cdot CH_2 \cdot OH$ (1,2)
Phthalic anhydride
Salicylic acid
Umbelliferone 7-hydroxycoumarin $C_9H_6O_3$ Some of the above are toxic in different degrees and the range of temperature under which sublimation occurs varies over a wide range. Also their ratio of sublimation varies, hence the present invention may be advantageously employed under almost any condition. In certain circumstances the part to be lubricated may be in quite a hot area, and in the above list are solids that commence their sublimation at 100° C.

In any event, the rate of discharge of the lubricant can be controlled so that the bearings will receive a continuous supply of fresh lubricant in substantially the amount necessary to maintain them at their highest efficiency. Since the only effective lubricant in a bearing is a thin film, it is obvious that a periodic tightening of grease cups or application of grease is usually inadequate, since the film supplied with each injection is relatively quickly dissipated in the operation of the machine. Relatively small devices of the present invention may maintain a substantially continuous film of new grease or lubricant for several weeks before the supply is exhausted.

I claim:

1. In a lubricating system, a cylinder, a piston reciprocable within said cylinder, an opening provided in one end of said cylinder, power means connected with said piston at the end thereof opposite to said one end for moving said piston toward said one end whereby material adapted to be positioned within said cylinder and between said one end and said piston will be moved through said aperture, a member rigid with said piston and movable therewith in the same direction as said piston when the latter is moved under the influence of said power means, means stationary relative to said cylinder for holding a sublimable solid in engagement with said member for restricting said movement of said member and consequently said piston in said direction toward said one end to a rate of movement directly proportional to the rate of sublimation of said solid and a sublimable body held in said last mentioned means.

2. A device for dispensing a lubricant to a bearing comprising: a container for a body of lubricant and having a discharge aperture for discharge of said lubricant to said bearing, a wall movable within said container against such body of lubricant for causing discharge of the latter when said body is within said container, power means for so moving said wall, means connecting said power means with said wall for so moving said wall by said power means and for restricting the rate of such movement of said wall including a body of inelastic material volatilizable to a progressively diminishing size in the presence of air and a member connected with said wall for movement therewith and held firmly against a side of said body of volatilizable material continuously by said power means during volatilization of said body of volatilizable material, and means for supporting said body of volatilizable material substantially stationary in a position obstructing free movement of said member in a direction for moving said wall against said fluid whereby the said rate of movement of said member and said wall will be proportional to the rate of volatilization of said body of volatilizable material.

3. A device for dispensing a lubricant to a bearing comprising in combination: a body of lubricant, a container enclosing said body having a discharge aperture for discharge of said lubricant to such bearing, movable power actuated means within said cylinder in engagement with a side of a said body remote from said aperture and supported within said container for movement in one direction toward said aperture for urging said lubricant through said aperture under pressure, power means operably connected with said power actuated means for so moving the latter in said one direction, a member connected with said power actuated means for movement therewith in said one direction as a unit therewith, and means for controlling the rate of movement of said power actuated means and said member in said one direction including a body of sublimable material and a stationary support holding said body of sublimable material against said member in a position obstructing free movement of said member and consequently said power actuated means in said one direction and permitting said movement of said member and consequently said power actuated means at a rate proportionate to the rate of sublimation of said body of sublimable material.

4. A device for dispensing a lubricant to a bearing comprising, in combination; a body of lubricant, a container enclosing said body having a discharge opening for discharge of said lubricant to such bearing, movable power actuated means movable against a side of said body for urging said lubricant through said aperture under pressure, power means operably connected with said power actuated means for so moving the latter, and means for controlling the rate of said movement of said power actuated means including a member connected with said power actuated means for movement in one direction in a predetermined path simultaneously with said power actuated means upon said movement of the latter and a body of material vaporizable to a diminishing size in the presence of air stationarily supported in said path in engagement with said member for restricting said power actuated means to said movement at a rate proportional to the rate of decrease in the size of said body of material during volatilizing thereof.

5. A device for dispensing a lubricant to a bearing comprising, in combination; a body of lubricant, a container enclosing said body having a discharge opening for discharge of said lubricant to such bearing, movable power actuated means movable against a side of said body for urging said lubricant through said aperture under pressure, power means operably connected with said power actuated means for so moving the latter, and means for controlling the rate of said movement of said power actuated means including a member connected with said power actuated means for movement in one direction in a predetermined path simultaneously with said power actuated means upon said movement of the latter and a body of material vaporizable to a diminishing size in the presence of air stationarily supported in said path in engagement with said member for restricting said power actuated means to said movement at a rate proportional to the rate of decrease in the size of said body of material during volatilizing thereof, a housing enclosing said vaporizable material for protecting the latter, said housing provided with means for admission of air to said material and for discharge of the vapors of said material therefrom.

6. A device for dispensing a lubricant to a bearing comprising; a cylinder for said lubricant having a dispensing aperture at one end thereof for discharge of such lubricant, a piston within said cylinder movable toward said one end for causing lubricant adapted to be positioned between said one end and said piston to be discharged from said one end, a piston rod connected with said piston for movement therewith, stop means stationary relative to said cylinder, a spring operably connected with said piston yieldably reacting between said stop means and said piston for moving said piston toward said one end, a member connected with said rod and piston for movement therewith, stop means stationary relative to said cylinder arranged and adapted to hold a sublimable body against said member for restricting the said movement of said member and consequently the movement of said piston and rod to a rate of movement directly proportional to the rate of sublimation of said body, and a body of sublimable material so held by said last mentioned stop means.

7. A device for dispensing a lubricant to a bearing comprising; a cylinder for said lubricant having a dispensing aperture at one end thereof for discharge of such lubricant, a piston within said cylinder movable toward said one end for causing lubricant adapted to be positioned between said one end and said piston to be discharged from said one end, a piston rod connected with said piston for movement therewith, stop means stationary relative to said cylinder, a spring operably connected with said piston yieldably reacting between said stop means and said piston for moving said piston toward said one end, a member connected with said rod and piston for movement therewith, stop means stationary relative to said cylinder arranged and adapted to hold a sublimable body against said member for restricting the said movement of said member and consequently the movement of said piston and rod to a rate of movement directly proportional to the rate of sublimation of said body, and a body of sublimable material so held by said last mentioned stop means, means movable relative to said body for variably exposing said body to the atmosphere for controlling the rate of sublimation of said body.

8. A device for dispensing a lubricant to a bearing comprising; a cylinder for said lubricant having a dispensing aperture at one end thereof for discharge of such lubricant, a piston within said cylinder movable toward said one end for causing lubricant adapted to be positioned between said one end and said piston to be discharged from said one end, a piston rod connected with said piston for movement therewith, stop means stationary relative to said cylinder, a spring operably connected with said piston yieldably reacting between said stop means and said piston for moving said piston toward said one end, a member connected with said rod and piston for movement therewith, stop means stationary relative to said cylinder arranged and adapted to hold a sublimable body against said member for restricting the said movement of said member and consequently the movement of said piston and rod to a rate of movement directly proportional to the rate of sublimation of said body, and a body of sublimable material so held by said last mentioned stop means, an imperforate housing extending over the upper and lateral sides of said body and spaced therefrom for protecting said body, said housing being open at its lower end for access of air to said body and for discharge of the products of sublimation.

References Cited in the file of this patent

UNITED STATES PATENTS

| | | |
|---|---|---|
| 425,936 | Essex | Apr. 15, 1890 |
| 2,577,337 | Lancaster | July 24, 1947 |